United States Patent [19]

Douglass, Jr.

[11] 4,068,854
[45] Jan. 17, 1978

[54] DUST SEAL FOR ROTATABLE SHAFT PASSING THROUGH A BIN WALL

[76] Inventor: Edward T. Douglass, Jr., 14 Clubview Drive, Birmingham, Ala. 35222

[21] Appl. No.: 757,446

[22] Filed: Jan. 6, 1977

[51] Int. Cl.$^2$ ............................................. B65D 53/02
[52] U.S. Cl. ................................. 277/237 A; 277/30; 277/167.5; 277/178; 277/186; 277/DIG. 4; 248/70; 285/192
[58] Field of Search ....................... 403/195, 197, 201; 308/187.1, 187.2, 36.1; 285/159, 192; 248/70, 74 R, 74 A, 74 B, 74 PB, 226.1; 277/30, 81 R, 81 S, 97, 98, 167.5, 178, 181–183, 186, 199, 197, 237 A, DIG. 4

[56] References Cited

U.S. PATENT DOCUMENTS

| 742,750 | 10/1903 | Stephenson | 277/237 A X |
| 1,081,443 | 12/1913 | Godfrey | 277/98 |
| 2,969,248 | 1/1961 | Sulkowski | 277/30 X |
| 4,004,766 | 1/1977 | Long | 248/70 X |

FOREIGN PATENT DOCUMENTS

| 576,782 | 4/1946 | United Kingdom | 285/192 |

*Primary Examiner*—Robert S. Ward, Jr.
*Attorney, Agent, or Firm*—Woodford R. Thompson, Jr.

[57] ABSTRACT

A dust seal between a rotatable shaft and a passageway through a bin wall. A split sleeve surrounds the shaft and each section thereof carries a laterally extending plate section. Adjacent edges of the plate sections abut and are secured to each other to provide a composite plate which covers the passageway and overlies the adjacent portion of the bin wall. Threaded members carried by the bin wall extend through elongated slots in the plate sections with each slot being of a width and length greater than the diameter of the threaded member to permit adjustment of the plate sections relative to the bin wall.

1 Claim, 3 Drawing Figures

DUST SEAL FOR ROTATABLE SHAFT PASSING THROUGH A BIN WALL

BACKGROUND OF THE INVENTION

This invention relates to a dust seal for use in a storage bin for fine particle size materials, such as powdered materials, sawdust and the like wherein a drive shaft projects through a passageway through the bin wall.

Heretofore in the art to which my invention relates, difficulties have been encountered in providing a dust seal between a rotary shaft and an opening through the bin wall for receiving the shaft due to the fact that the drive shaft is not always in true alignment with a passageway provided through the bin wall. That is, as the drive shaft is mounted in its bearings and installed, the center line of the shaft is not always in true alignment with the center line of the opening through the bin wall. Also, difficulties have been encountered in removing the drive shaft from the storage bin where the drive shaft extends through the wall of the storage bin due to the fact that a substantial amount of the storage bin structure had to be removed before the drive shaft could be removed.

SUMMARY OF THE INVENTION

In accordance with my present invention, I provide a dust seal for use between a rotatable shaft and a passageway through a bin wall which embodies a split sleeve encasement which fits snugly around the shaft and comprises adjacent sections which carry plate-like sections which extend laterally from the split sleeve with adjacent edges of the plate-like sections abutting each other and defining a composite plate which completely covers the opening through the bin wall and overlies the adjacent portion of the bin wall. Adjacent platelike sections are secured to each other to provide a dust-tight connection therebetween and threaded members are carried by the bin wall in position to extend outwardly therefrom and through elongated openings provided in the adjacent plate-like section. Each elongated slot is of a width and length greater than the diameter of the threaded members so as to permit lateral adjustment of the plate-like sections relative to the bin wall. Accordingly, I provide an improved seal between the rotary shaft and the passageway through the side wall of the storage bin which not only permits adjustment of the shaft relative to the opening through the bin wall but also permits easy removal of the shaft for maintenance purposes.

DESCRIPTION OF THE DRAWING

A dust seal embodying features of my invention is illustrated in the accompanying drawing, forming a part of this application, in which.

DETAILED DESCRIPTION

Figure 1:
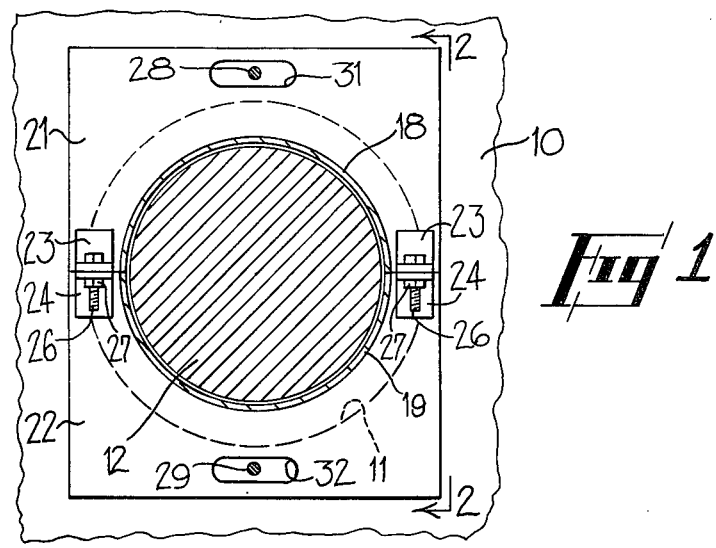
FIG. 1 is a sectional view taken generally along the line 1—1 of FIG. 2.
Figure 3:
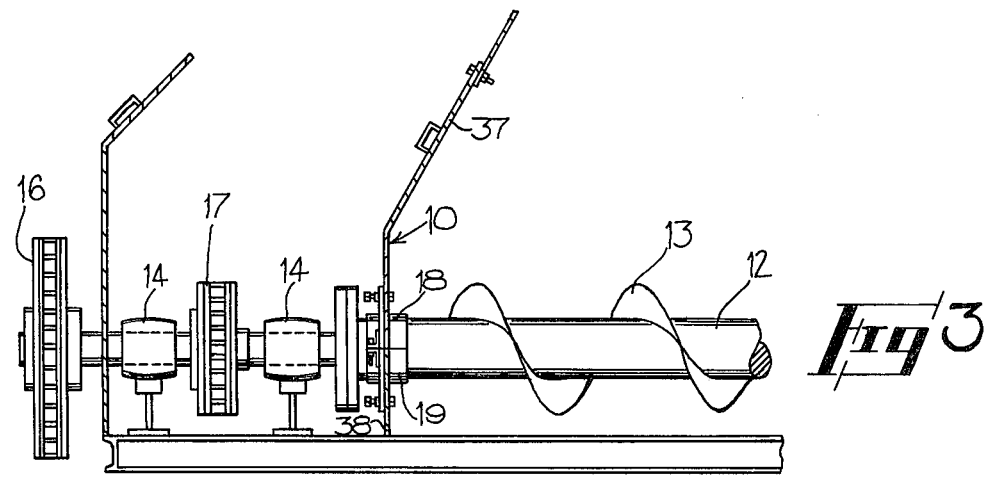
FIG. 3 is a sectional view, drawn to a smaller scale, showing a fragment of a storage bin and a drive shaft for a screw-type conveyor, together with means for driving the drive shaft.

Referring now to the drawing for a better understanding of my invention, I show an upstanding bin wall 10 of a storage bin for fine particle size materials, such as powered materials, sawdust and the like. As shown in FIG. 1, an opening 11 is provided through the bin wall 10 for passing a rotatable shaft 12 which is shown as carrying a spiral conveyor flight 13 which may be employed for conveying or agitating small particle size materials in the storage bin. As shown in FIG. 1, the passageway 11 is larger than the shaft 12 whereby the shaft 12 may be moved laterally during installation to a selected position within the confines of the passageway 11. As shown in FIG. 3 the shaft 12 is supported by suitable bearings 14 and is driven by suitable means through a chain drive 16. Also, if desired, other drive shafts may be driven from drive shaft 12 by operatively connecting said shafts to shaft 12 by a drive chain arrangement 17.

Figure 2:
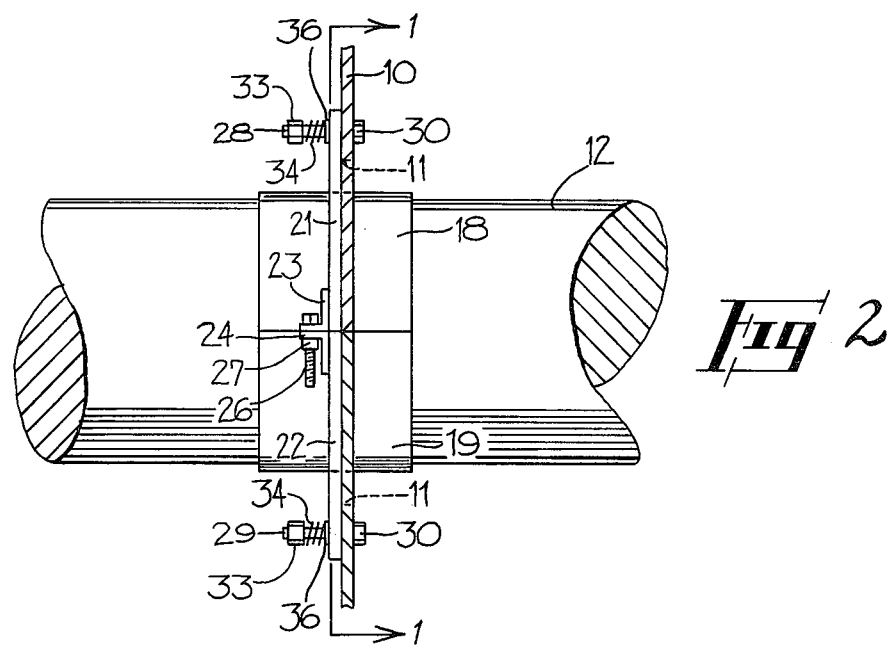
FIG. 2 is a sectional view taken generally along the line 2—2 of FIG. 1.

My improved dust seal comprises a split sleeve unit having an upper section 18 and a lower section 19 which are adapted to surround the shaft 12 with a snug, rotatable fit. The sleeve section 18 carries a laterally extending plate-like section 21 while the lower sleeve section 19 carries a laterally extending plate-like section 22. The plate-like sections 21 and 22 may be secured to the semi-cylindrical sleeve sections 18 and 19 by suitable means, such as by welding, or may be formed integrally therewith. As shown in FIGS. 1 and 2, adjacent edges of the plate-like sections 21 and 22 abut each other to define a composite plate which is of a size and shape to completely cover the passageway 11 provided through the bin wall 10 and overlie the adjacent portion of the bin wall surrounding the passageway 11.

As shown in FIGS. 1 and 2, angle brackets 23 and 24 are secured to the plate-like sections 21 and 22, respectively, adjacent the abutting edges thereof. Suitable openings are provided through horizontal flanges of the angle brackets 23 and 24 for receiving retaining bolts 26 having retaining nuts 27. Accordingly, the abutting edges of the plate-like sections 21 and 22 are secured to each other to provide a dust-tight connection therebetween.

Extending through suitable openings through the portion of the bin wall surrounding the opening 11 are upper and lower threaded members 28 and 29, respectively. The threaded members 28 and 29 are preferably in the form of bolts having their heads 30 fixedly secured to the bin wall 10 by suitable means, such as by welding. The threaded members 28 and 29 extend outwardly from the bin wall 10 toward the plate-like sections 21 and 22, as shown. An elongated opening 31 is provided in the plate-like section 21 for receiving the threaded member 28. In like manner, an elongated opening 32 is provided in the plate-like section 22 for receiving the threaded member 29. The threaded members 28 and 29 carry suitable lock nuts 33, as shown in FIG. 2.

Mounted between the lock nuts 33 and the adjacent platelike member 21 or 22, as the case may be, is a resilient spring member 34 and a washer 36. Accordingly, upon tightening the lock nuts 33, the spring elements 34 urge the plate-like sections 21 and 22 toward the adjacent side of the bin wall 10 to thus firmly secure the plate-like sections 21 and 22 in place and provide a dust-tight seal therebetween. As shown in FIG. 1, the elongated slots 31 and 32 are of a width and length greater than the diameter of the threaded members 28 and 29 to permit lateral adjustment of the plate-like sections relative to the bin wall 10. Preferably, the elongated slots 31 and 32 are at least one-fourth of an inch wider than the diameter of the threaded members 28 and 29. Also, the length of each elongated slot 31 and 32 is preferably several inches longer than the diameter of the threaded members 28 and 29. By providing the elongated slots 31 and 32 above and below the shaft 12, the plate-like sections 21 and 22 are adapted for both vertical and horizontal adjustment relative to the bin wall 10.

Preferably, the bin wall 10 is divided to form an upper section 37 and a lower section 38 with the dividing line being along a line which is adjacent the line along with the platelike sections 21 and 22 abut each other. Accordingly, the upper section 37 of the bin wall 10 may be removed along with the upper section 18 of the split sleeve without removal of the lower section 38 of the bin wall 10. Accordingly, by separating the end of the drive shaft 12 from its driving means, the shaft 12 may be lifted from the apparatus without removing the lower section 38 of the bin wall.

From the foregoing description, the operation and assembly of my improved dust seal will be readily understood. The lower split sleeve section 19 and its plate-like member 22 are attached to the lower section 38 of the bin wall 10 by the threaded member 29 and its lock nut 33. Due to the fact that the lower plate-like section 22 might require adjustment relative to the bin wall 10, the lock nuts 33 are not tightened until the shaft 12 is in place. With the lower plate-like section 22 thus positioned, the shaft 12 is mounted in the storage bin with one end projecting through the passageway 11. The drive shaft 12 is mounted in the supporting bearings 14 and is operatively connected to the drive mechanism in the usual manner. With the drive shaft 12 thus mounted for rotation within the storage bin, the upper plate-like section 21 is mounted about the upper portion of shaft 12 in abutting relationship to the lower plate-like section 22. The nuts 27 are tightened whereby the upper plate-like section 21 is secured rigidly to the lower plate-like section 22. With the platelike sections thus mounted in position to completely cover the passageway 11 through the bin wall 10 and overlie the adjacent portion thereof, the lock nuts 33 are tightened to exert pressure on the resilient spring members 34 whereby the platelike members 21 and 22 are urged firmly against the adjacent portion of the bin wall 10.

From the foregoing, it will be seen that I have devised an improved dust seal for use between a rotatable shaft and a passageway through the wall of a storage bin. By providing split sleeve sections which carry laterally extending plate-like members, the dust seal may be installed in sections and at the same time the shaft may be removed by separating the plate-like sections 21 and 22, thus eliminating the necessity of having to remove the lower section 38 of the bin wall for maintenance purposes. Also, by providing a composite plate-like member which completely encases the shaft and overlies the adjacent portion of the bin wall 10, a dust-tight unit is provided and at the same time the shaft may be installed in true alignment with its split sleeve connection even though the center line of the shaft is not in true alignment with the center line of the passageway through the bin wall. Furthermore, by providing the elongated slots of a width and length greater than the diameter of the threaded retaining members 28 and 29, the plate-like members carried by the sleeve unit may be adjusted with a minimum of effort and time to assure true alignment of the shaft with the split sleeve unit after installation.

While I have shown my invention in but one form, it will be obvious to those skilled in the art that it is not so limited, but is susceptible of various changes and modifications without departing from the spirit thereof.

What I claim is:

1. In a dust seal for use between a rotatable shaft and a passageway through a bin wall through which said shaft extends with said bin wall being divided along a generally horizontal line into upper and lower sections,
    a. a split sleeve having at least two adjacent sections adapted to surround said shaft with a snug, rotatable fit,
    b. a plate-like section carried by each section of said split sleeve and extending laterally therefrom with adjacent edges of adjacent platelike sections abutting each other along the line dividing the bin wall into upper and lower sections and defining a composite plate of a size and shape to completely surround said passageway through the bin wall and overlie the adjacent portion of said bin wall surrounding said passageway,
    c. means securing said adjacent plate-like sections to each other to provide a dust-tight connection therebetween,
    d. at least two threaded members carried by said adjacent portion of said bin wall and extending outwardly therefrom toward said plate-like sections, and
    e. elongated slots in said plate-like sections in position to receive said threaded members with each said elongated slot being of a width and length greater than the diameter of said threaded members and extending in horizontal planes above and below said shaft to permit lateral adjustment of said plate-like sections both vertically and horizontally relative to said bin wall.

* * * * *